United States Patent
Hilgers

(10) Patent No.: US 7,750,865 B2
(45) Date of Patent: Jul. 6, 2010

(54) MULTIPURPOSE ANTENNA CONFIGURATION FOR A CONTACTLESS DATA CARRIER

(75) Inventor: Achim Hilgers, Alsdorf (DE)

(73) Assignee: NXP B.V., Eindhoven (NL)

( * ) Notice: Subject to any disclaimer, the term of this patent is extended or adjusted under 35 U.S.C. 154(b) by 680 days.

(21) Appl. No.: 11/658,225

(22) PCT Filed: Jul. 14, 2005

(86) PCT No.: PCT/IB2005/052336

§ 371 (c)(1),
(2), (4) Date: Jan. 22, 2007

(87) PCT Pub. No.: WO2006/011091

PCT Pub. Date: Feb. 2, 2006

(65) Prior Publication Data
US 2009/0002253 A1    Jan. 1, 2009

(30) Foreign Application Priority Data
Jul. 20, 2004 (EP) .................................. 04103456

(51) Int. Cl.
*H01Q 9/16*    (2006.01)

(52) U.S. Cl. ..................................... 343/806; 343/807
(58) Field of Classification Search ................. 343/795, 343/805, 806, 807, 808, 809, 792.5, 828, 343/700 MS, 726, 857, 735, 736, 743
See application file for complete search history.

(56) References Cited

U.S. PATENT DOCUMENTS

| | | | | |
|---|---|---|---|---|
| 3,928,854 A * | 12/1975 | Tacussel | ..................... | 343/735 |
| 5,966,098 A * | 10/1999 | Qi et al. | ..................... | 343/702 |
| 6,940,455 B2 * | 9/2005 | Plettner | ............... | 343/700 MS |
| 6,975,278 B2 * | 12/2005 | Song et al. | .................. | 343/795 |
| 6,999,028 B2 * | 2/2006 | Egbert | ................ | 343/700 MS |
| 2004/0036655 A1 * | 2/2004 | Sainati et al. | ............... | 343/702 |

* cited by examiner

*Primary Examiner*—Michael C Wimer
*Assistant Examiner*—Kyana R Robinson

(57) ABSTRACT

In an antenna configuration (4) with two antenna arms (5, 6) arranged in a V-shape, two coupling zones (13, 14) for electrically coupling to respective terminals of an integrated component (15) are provided in the region of the ends (7, 8) of the antenna arms (5, 6) lying close together, wherein each of the two antenna arms (5, 6) in addition comprises a coupling region (20, 21) at a distance from its coupling zone (13, 14), and each coupling region (20, 21) is designed for electrically coupling to a terminal of a further electronic component (22).

4 Claims, 2 Drawing Sheets

MULTIPURPOSE ANTENNA CONFIGURATION FOR A CONTACTLESS DATA CARRIER

FIELD OF THE INVENTION

The invention relates to an antenna configuration, which comprises a carrier for carrying antenna arms of the antenna configuration, and which comprises a first antenna arm and a second antenna arm, wherein each of the two antenna arms is connected to the carrier and is formed from an electrically conductive material and comprises a first end and a second end and a central longitudinal portion extending from the first end to the second end, and wherein said two central longitudinal portions are at a first distance from one another at the two first ends, and each of the two first ends has a coupling zone for electrically coupling to a terminal of an integrated component, which two coupling zones are at a second distance from one another, while said integrated component is designed for communicating in a contactless manner, and wherein said two central longitudinal portions are at a third distance from one another at the two second ends, which third distance is greater than the first distance and greater than the second distance.

The invention further relates to a data carrier for contactless communication with a communication station, which data carrier has an antenna configuration.

BACKGROUND OF THE INVENTION

An antenna configuration of the kind mentioned in the opening paragraph and a data carrier of the kind mentioned in the second paragraph above are known, for example, from the patent document JP 07-271.938 A. The known data carrier is a chip card, which has a card body, said card body forming a carrier for a known antenna configuration. The antenna configuration here comprises two antenna arms arranged in a V-shape, which two antenna arms have a constant width between their first end and their second end. The two central longitudinal portions of the two antenna arms of the known antenna configuration enclose an obtuse opening angle, such that the opening angle has a value of approximately 140°. Owing to the wide opening angle, the central longitudinal portions of the two antenna arms are at a comparatively large distance from one another, except for the region of their first ends, which is indeed favorable for a good decoupling of the two antenna arms, but which also has disadvantages that have manifested themselves in tests carried out at applicant's. Only a single integrated component is connected to the known data carrier with the known antenna configuration, while the cited patent document does not discuss in any detail by means of what connecting technology the electrical coupling between the antenna configuration and the integrated component is achieved. A limitation and disadvantages are accordingly present in the known antenna configuration and the known data carrier, because a large opening angle is present between the antenna arms, and the antenna configuration is constructed and suitable only for an electrical coupling and accordingly for an operational co-operation with only a single integrated component.

OBJECT AND SUMMARY OF THE INVENTION

The invention has for its object to eliminate the problems mentioned above and to provide an improved antenna configuration and an improved data carrier.

To achieve the object mentioned above, inventive features are provided in an antenna configuration according to the invention, such that an antenna configuration according to the invention can be characterized as follows:

An antenna configuration, which comprises a carrier for carrying antenna arms of the antenna configuration, and which comprises a first antenna arm and a second antenna arm, wherein each of the two antenna arms is connected to the carrier and is formed from an electrically conductive material and comprises a first end and a second end and a central longitudinal portion extending from the first end to the second end, and wherein said two central longitudinal portions are at a first distance from one another at the two first ends, and each of the two first ends has a coupling zone for electrically coupling to a terminal of an integrated component, which two coupling zones are at a second distance from one another, while said integrated component is designed for communicating in a contactless manner, and wherein said two central longitudinal portions are at a third distance from one another at the two second ends, which third distance is greater than the first distance and greater than the second distance, and wherein the two central longitudinal portions of the two antenna arms enclose at least an acute opening angle with one another, and wherein each of the two coupling zones for the electrical coupling to a terminal of the integrated component is provided on the carrier by a first connecting technology, and wherein each of the two antenna arms in addition has a coupling region at a distance from its coupling zone, and wherein said two coupling regions are at a fourth distance from one another, which fourth distance is greater than the second distance, and wherein each of the two coupling regions for electrically coupling to a terminal of a further electronic component is arranged on the carrier by a certain connecting technology.

To achieve the object described above, according to the invention in a data carrier for contactless communication with a communication station, which data carrier comprising an antenna configuration, it is provided that an antenna configuration according to the invention is provided. Such an antenna configuration according to the invention has been described in the preceding paragraph.

The provision of the features according to the invention achieves in a simple manner and practically without additional expenditure that the antenna configuration is advantageously suitable to serve as a multipurpose antenna configuration, i.e. the antenna configuration according to the invention is suitable for electrically coupling to an integrated component or for electrically coupling to a further electronic component selected from a plurality of further electronic components, so that various data carriers can be realized with different fittings in a simple manner, i.e. with different integrated components or with different further electronic components. This provides the essential advantage that the integrated component and the further electronic components, of which preferably, but not necessarily exclusively, one can be electrically coupled to the antenna configuration according to the invention each time, can differ from one another relatively clearly as regards their housing arrangements, i.e. in particular as regards the size of the housing used in each case and accordingly as regards the distance of terminals accessible from outside the housing for coupling to the antenna arms of the antenna configuration according to the invention.

It was found to be very advantageous in the solutions according to the invention when each of the two coupling zones for electrically coupling to a terminal of the integrated component is arranged on the carrier by a flip-chip technology. An electrical coupling between the two coupling zones and the two terminals of the integrated component can thus be realized in a particularly simple and inexpensive manner. Furthermore, such an arrangement is favorable in that it is very small and flat. A further advantage is that the coupling zones need not be gold-plated for achieving a perfect electrically conductive connection as the electrical coupling.

It was also found to be advantageous, however, in the solutions according to the invention when each of the two coupling zones for electrically coupling to a terminal of the integrated component is arranged on the carrier by a wire-bonding technology. This provides the advantage that no particularly accurate positioning of the integrated component with respect to the carrier for the antenna arms, and accordingly with respect to the antenna arms themselves, need be carried out during the manufacture of the two electrical couplings in the form of two electrically conductive connections between the two coupling zones and the two terminals of the integrated component. It is true that such a construction cannot be as flat as a construction using a flip-chip technology, but it can still be made very flat. A particular advantage of such an arrangement is that practically no undesirable capacitive couplings occur between the terminals of the integrated component and the coupling zones.

It was further found to be very advantageous in the solutions according to the invention when each of the two coupling regions for electrically coupling to a terminal of a further electronic component is arranged on the carrier by a soldering technology. This construction offers the advantage of a high flexibility as regards the positions of the coupling regions. This solution furthermore renders it possible to realize particularly robust electrical couplings that can be highly loaded in the form of electrically conductive connections between the coupling regions and the terminals of a further electronic component. Such a solution offers the advantage that a high manufacturing speed is possible, i.e. a large number of products per unit time. Furthermore, this solution offers the advantage that it is possible in a comparatively simple manner to make a defective electronic component operational again through replacement of the ICs present therein.

It was further found to be very advantageous in the solutions according to the invention when each coupling region is provided on an extension that projects laterally from an antenna arm. A particularly high flexibility as regards the positions of the coupling regions is made available thereby.

It was further found to be advantageous in the solutions according to the invention when the extensions are formed by elongate strips or by rounded bulges, while it was found to be advantageous in the case of elongate strips when said elongate strips are provided at sides of the antenna arms facing away from one another, while in the case of rounded bulges it was found to be advantageous when said bulges are provided on mutually facing sides of the antenna arms.

It was furthermore found to be very advantageous in the solutions according to the invention when each antenna arm has a width that increases from its first end towards its second end. This arrangement offers the major advantage that a substantially improved radiation efficiency is safeguarded in comparison with a solution with antenna arms having a constant width.

It was furthermore found to be very advantageous in the solutions according to the invention when each antenna arm is angled and has an angled portion extending towards its first end. Such an arrangement offers the advantage that a comparatively strong coupling obtains between the two antenna arms only in the region of the angled portions, whereas in the remaining portions of the two antenna arms only a comparatively weak coupling obtains because of the relatively large distance between the two antenna arms, which is very advantageous in view of a maximum radiation efficiency of the antenna configuration.

The above and further aspects of the invention will become apparent from the ensuing description and are clarified with reference to embodiments.

BRIEF DESCRIPTION OF THE DRAWINGS

The invention will now be explained in more detail with reference to a few embodiments shown in the drawings, to which, however, the invention is by no means limited.

DESCRIPTION OF EMBODIMENTS

Figure 1:
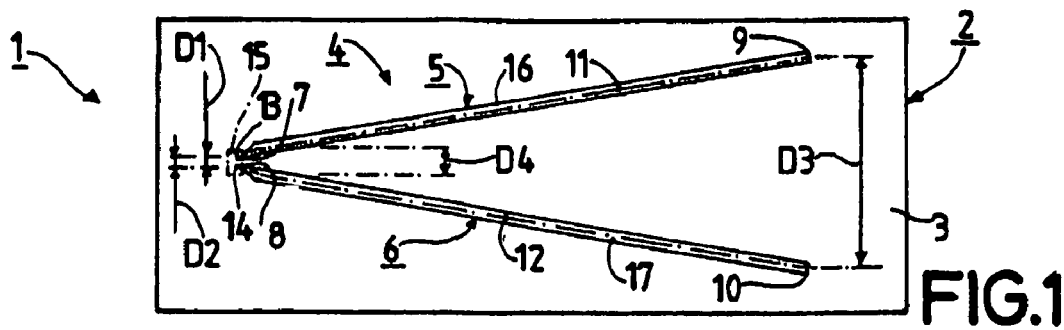
FIG. 1 diagrammatically shows a data carrier in a first embodiment of the invention with an antenna configuration in a first embodiment of the invention.
Figure 2:
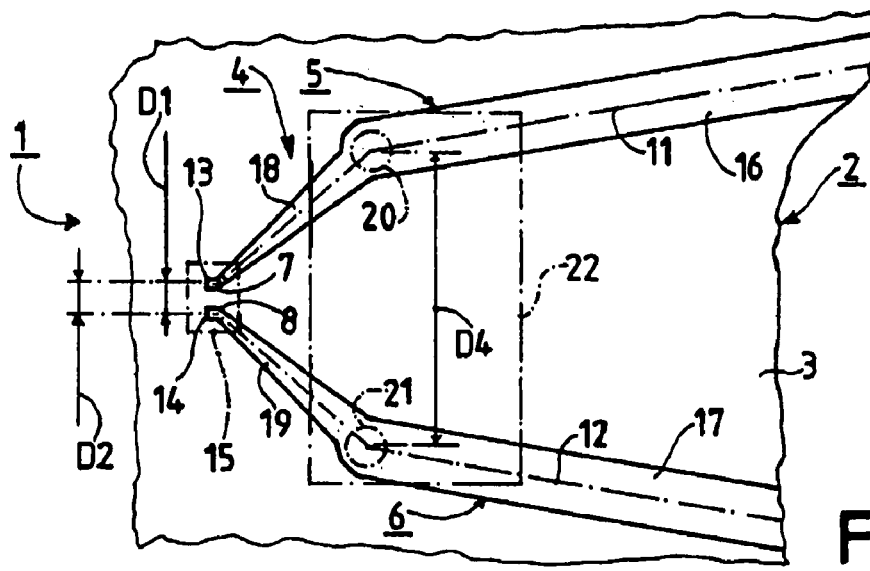
FIG. 2 shows on a larger scale than FIG. 1 a portion of a data carrier of FIG. 1 and a portion of the antenna configuration of the data carrier of FIG. 1.

FIG. 1 shows a data carrier 1, which constitutes a so-termed label or a so-termed tag. Such a data carrier may alternatively be constructed as a contactless chip card. The data carrier 1 is provided and constructed for achieving contactless communication with a communication station (not shown). The data carrier 1 comprises a data carrier body 2. The data carrier body 2 in the present case consists of two synthetic resin foils that have been interconnected in a lamination process. Only one of these two foils, however, of the data carrier body 2 is shown in FIGS. 1 and 2. This one foil forms a carrier 3, which serves to support an antenna configuration 4 of the data carrier 1. The data carrier body 2 may alternatively be formed from a different dielectric material, for example from paper or a PC-board material. The contactless communication with a communication station as mentioned above can be carried out by means of the antenna configuration 4, which communication involves both a transmission of data from the communication station to the data carrier 1 and a transmission of data from the data carrier 1 to the communication station.

The antenna configuration 4 has two antenna arms 5 and 6, each of said two antenna arms 5, 6 being connected to the carrier 3. The two antenna arms 5 and 6 are made of electrically conductive material, i.e. of copper in this case. The two antenna arms 5 and 6 may alternatively be made from a different electrically conductive material, for example from silver, gold, aluminum, or carbon paste. The two antenna arms 5, 6 have been provided on the carrier 3 by means of an etching process in the present case. The antenna arms 5, 6 may alternatively be manufactured in a printing process. Each of the two antenna arms 5, 6 has a first end 7, 8 and a second end 9, 10. Furthermore, each of the two antenna arms 5, 6 has a central longitudinal portion 11, 12 extending from the first end 7, 8 to the second end 9, 10. The two longitudinal portions 11, 12 are indicated with dash-dot lines in FIGS. 1 and 2.

The two central longitudinal portions 11, 12 of the two antenna arms 5, 6 are at a first distance D1 from one another at the two first ends 7, 8 of the two antenna arms 5, 6. Each of the two first ends 7, 8 of the two antenna arms 5, 6 has a coupling zone 13, 14 for electrically coupling to a terminal of an integrated component 15. The integrated component 15 is designed for contactless communication, as has long been known to those skilled in the art. The integrated component 15 is indicated in FIGS. 1 and 2 with a dash-dot line so as to keep the drawing clearer. For the same reason, the two terminals of the integrated component 15 are not shown in FIGS. 1 and 2, because such a construction of an integrated component 15 has also long been known to those skilled in the art. The two coupling zones 13, 14 of the two antenna arms 5, 6 are at a second distance D2 from one another. The second distance D2 is the same as the first distance D1 in the present case. This, however, need not necessarily be the case, because the first distance D1 and the second distance D2 may also be different, in which case the second distance D2 should preferably be greater than the first distance D1, but it may alternatively also be chosen to be smaller than the first distance D1. The two central longitudinal portions 11, 12 of the two antenna arms 4, 5 are at a third distance D3 from one another at the two second ends 9, 10 of the two antenna arms 5, 6. The third distance D3 is greater than the first distance D1 and greater than the second distance D2.

Each of the two antenna arms 5, 6 is angled in shape in the antenna configuration 4 of FIGS. 1 and 2 and accordingly has a longer base portion 16, 17 extending from the second end 9, 10 and an angled portion 18, 19 extending from the base portion 16, 17 towards its first end 7, 8. The central longitudinal portions 11, 12 of the two antenna arms 5, 6 enclose a first, acute opening angle between the two base portions 16, 17, and a second acute opening angle between the angled portions 18, 19. The first acute opening angle has a value of approximately 20°. The second acute opening angle has a value of a little below 90°. It is essential in the present case that the two central longitudinal portions 11 and 12 enclose an acute opening angle with one another in the region of the base portions 16 and 17, for which an upper limit for the first acute opening angle of 40° was found to be advantageous. It is particularly advantageous, however, when the first acute opening angle has smaller values than 40°, for example the 20° mentioned-above, or alternatively even smaller values, which may be, for example 10°, 7°, or 5°.

In the construction of FIGS. 1 and 2, the opening angle between the two angled portions 18, 19 of the two antenna arms 5, 6 is an acute angle of just below 90°. Alternatively, however, a smaller acute opening angle may be provided between the two angled portions 18, 19. It should be emphasized, however, that an opening angle may alternatively be provided between the two angled portions 18, 19 of the two antenna arms 5, 6 which is greater than 90°, in which case this opening angle is no longer acute, but obtuse, but the short length of the angled portions 18, 19 implies that this has no effect on the situation that an acute angle is present, viewed as a whole, between the two central longitudinal portions 11, 12 of the antenna arms 5, 6. Reference is already made here to the construction of FIG. 5 in this connection.

Regarding an antenna configuration with two antenna arms in which the central longitudinal portions of the two antenna arms mutually enclose an acute opening angle, reference may be made here to the European patent application with application no. EP 04 100 904.4 of Mar. 5, 2004 (PHAT040013), the disclosure of this patent application being included herein by reference.

Each of the two coupling zones 13, 14 is provided on the carrier 3 for the purpose of electrically coupling to a terminal of the integrated component 15 by a first connecting technology in the data carrier 1 and the antenna configuration 4 of FIGS. 1 and 2. Each of the two coupling zones 13, 14 is provided on the carrier for electrically coupling to a terminal of the integrated component 15 by a flip-chip technology in the present case. In other words, the second distance D2 between the two coupling zones 13, 14 is chosen so as to correspond to the distance between the two terminals (not shown) of the integrated component 15, and the electrical coupling is realized in the form of an electrically conductive connection. To manufacture the electrically conductive connection between the two terminals of the integrated component 15 and the coupling zones 13, 14, the integrated component 15 should first be brought into a changed position in which the terminals (not visible in FIGS. 1 and 2) point towards the coupling zones 13, 14, whereupon the integrated component 15 is laid with its two terminals on the coupling zones 13, 14, and subsequently electrically conductive connections are created between the terminals of the integrated component 15 and the coupling zones 13, 14, i.e. in the present case by means of a thermocompression process. Instead of the thermo-compression process, other processes may be used, for example adhesion processes in which an electrically conductive adhesive is used.

It is to be noted on the electrical coupling of the two terminals of an integrated component 15 brought into a rotated position and the two coupling zones 13, 14 that such an electrical coupling may be realized not only by means of an electrically conductive connection, but also in that a capacitive coupling is created between the terminals of the integrated component 15 suitably constructed for this and the equally suitably designed coupling zones 13, 14.

It may alternatively be provided in the data carrier 1 and the antenna configuration 4 of FIGS. 1 and 2, however, that each of the two coupling zones 13, 14 is provided on the carrier 3 for the purpose of electrically coupling to a terminal of a different integrated component by a wire-bonding technology. In this case the distance between the two coupling zones 13, 14 may either be as great as in the arrangement depicted in FIGS. 1 and 2, or a modification of this arrangement may be chosen in which the second distance D2 between the two coupling zones 13, 14 is chosen to be greater. It should be heeded in all cases, however, that the second distance D2 is chosen such that as short as possible bonding wires are required for connecting the terminals of the other integrated component to the coupling zones 13, 14. Reference is made already here to the construction shown in FIG. 3 in this connection.

In the arrangement of FIGS. 1 and 2, each of the two antenna arms 5, 6 comprises in addition a coupling region 20, 21 at a distance from the coupling zone 13, 14. The two coupling regions 20, 21 are indicated each with a dash-dot circle in FIG. 2, but this is not to be regarded as limiting the actual geometrical shape of the two coupling regions 20, 21 in any way whatsoever. The two coupling regions 20, 21 are at a fourth distance D4 that is greater than the second distance D2. Each of the two coupling regions 20, 21 is provided on the carrier 3 for electrically coupling to a terminal of a further electronic component 22 by a certain connecting technology. The other electronic component 22 is indicated in FIG. 2 with dash-dot lines only, and the two electrical connections of the further electronic component 22 are again not shown. The further electronic component 22 in this case is a so-termed SMD component with a given housing shape, which is known to those skilled in the art under the designation TSSOP-8. For adaptation to the construction of the further electronic component 22, each of the two coupling regions 20, 21 is here arranged on the carrier 3 for electrically coupling to a terminal of the further electronic component 22 by a soldering technology. This means that the electrical coupling of the further electronic component 22 is achieved by means of an electrically conductive connection manufactured in a soldering process.

It is thus achieved in a simple manner in the data carrier 1 and the antenna configuration 4 of FIGS. 1 and 2 that either the integrated component 15 can be brought into operational connection to the advantageously constructed antenna configuration 4 by means of a flip-chip technology, or a different integrated component not shown in FIG. 2 may thus be connected by a wire bond technology, or the other electronic component 22 may thus be connected by means of a soldering technology, which provides the advantage that one and the same antenna configuration 4 can serve to realize different data carriers 1, which data carriers 1 differ from one another as regards the integrated component or further electronic component provided on the relevant data carrier 1.

Figure 3:
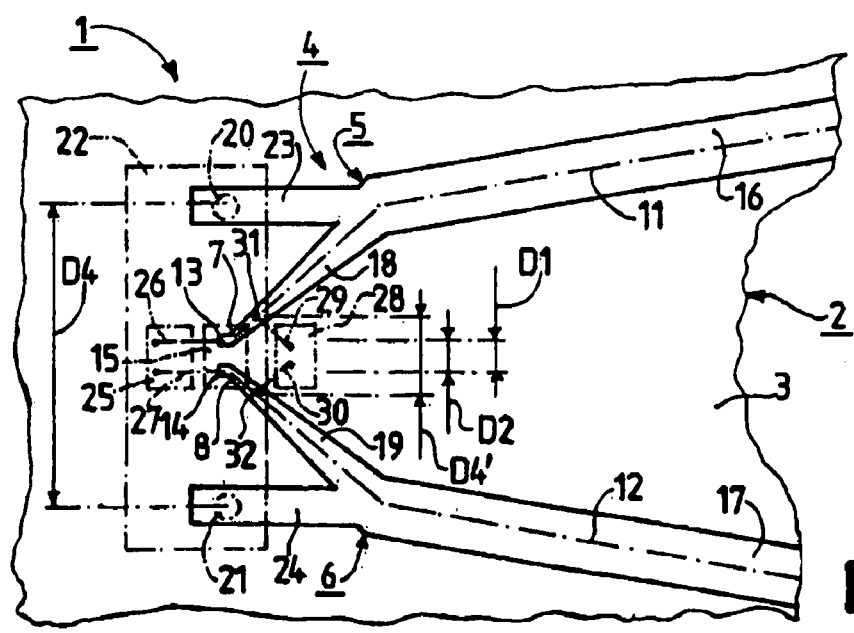
FIG. 3 shows in the same manner as FIG. 2 a portion of a data carrier in a second embodiment of the invention and a portion of an antenna configuration in a second embodiment of the invention.

FIG. 3 shows a modification of the construction of a data carrier 1 and an antenna configuration 4 as shown in FIGS. 1 and 2. In the data carrier 1 and the antenna configuration 4 of FIG. 3, each of the two coupling regions 20, 21 is provided on a lateral extension 23, 24 projecting from a respective antenna arm 5, 6, in contrast to the arrangement of FIG. 2, in which arrangement of FIG. 2 the coupling regions 20, 21 lie in the transition regions between the base portions 16, 17 and the angled portions 18, 19 of the antenna arms 5, 6. The extension 23, 24 of each antenna arm 5, 6 projects laterally from the side of the antenna arm 5, 6 facing away from the other antenna arm 6, 5. In the present case, each extension 23, 24 is given the shape of an elongate strip, the two strips being parallel to one another and being integrally joined to the angled portions 18, 19 in the vicinity of the transition region between the base portion 16, 17 and the angled portion 18, 19. It should be noted on the extensions 23, 24 formed by the strips that these extensions 23, 24 may have different lengths, such that the respective length is chosen so as to correspond to the housing dimensions of the further electronic component 22 to be connected by its two terminals to the connection regions 20, 21. This renders it possible in a simple manner to provide an operational connection between the antenna configuration 4 and an SMD component denoted TSSOP-4, or an SMD component denoted TSSOP-6, or an SMD component denoted TSSOP-8.

The extensions 23, 24 formed as mutually parallel strips achieve in a simple and advantageous manner that the mechanical stability of the soldered joints between the antenna configuration 4 and the further electronic component 22 is substantially improved. The arrangement of the extensions 23, 24 as elongate strips further provides the advantage that different impedance values can be achieved in a simple manner in that the elongate strips are given different lengths. Furthermore, such elongate strips offer the advantage that the resonance frequency of the combination of the antenna configuration 4 and the further electronic component 22 connected to the antenna configuration 4 via the strips can be influenced in a simple manner through a suitable choice of the length of the elongate strips, so as to put the resonance frequency in a desired frequency band, for example in a frequency band of 902 MHz to 928 MHz.

FIG. 3 shows an integrated component 15 whose two terminals are electrically coupled to the two coupling zones 13, 14 by a flip-chip technology. FIG. 3 shows a further integrated component 25 whose two terminals are electrically coupled to the two coupling zones 13, 14 by means of two bonding wires 26, 27 by a wire-bonding technology, i.e. are electrically conductively connected. FIG. 3 shows yet a further integrated component 28 whose two terminals are again electrically conductively connected to two further coupling regions 31, 32 of the two antenna arms 5, 6 by means of two bonding wires 29, 30 by a wire-bonding technology. The two further coupling regions 31, 32 are indicated with dots only in FIG. 3. The two further coupling regions 31, 32 lie on the angled portions 18, 19 of the antenna arms 5, 6, while the distances of the two further coupling regions 31, 32 to the coupling zones 13, 14 are chosen such that these distances practically correspond to the lengths of the two bonding wires 29, 30, with the result that substantially the same connection conditions are present for the integrated component 28 and for the integrated component 15.

Of the three integrated components 15, 25, 28 and the further electronic component 22 shown in FIG. 3, only one of this total of four components is electrically coupled to the antenna configuration 4 each time, such that a corresponding data carrier 1 for contactless communication is realized. It is alternatively possible and indeed advantageous in many cases to realize a solution in which not a single component is coupled to an antenna configuration according to the invention, but two or three such components.

Two pairs of coupling regions are provided in the antenna configuration 4 of FIG. 3, i.e. the two coupling regions 20, 21 and the two coupling regions 31, 32. It should be noted that further such pairs of coupling regions for electrically coupling to the two terminals of a further electronic component may be provided.

It is to be noted on the antenna configuration 4 of FIG. 3 that the two laterally projecting extensions 23, 24 need not necessarily run parallel, but may be at an angle to one another, in which case they may lie closer to the first ends 7, 8 of the two antenna arms 5, 6 with their free ends or farther away from the first ends 7, 8 of the two antenna arms 5, 6, depending on the two terminals of a further electronic component 22 to be coupled to the antenna arms 5, 6. The further electronic component 22 may alternatively be provided for co-operating with a sensor, for example with a temperature sensor, a humidity sensor, a tension sensor, a force sensor, and the like, in which case it is advantageous to provide the relevant sensor also on the carrier 3 of the antenna configuration and to provide in addition connecting lines on the carrier 3 for connecting the sensor to additional terminals of the further electronic component 22 provided for this purpose.

Figure 4:
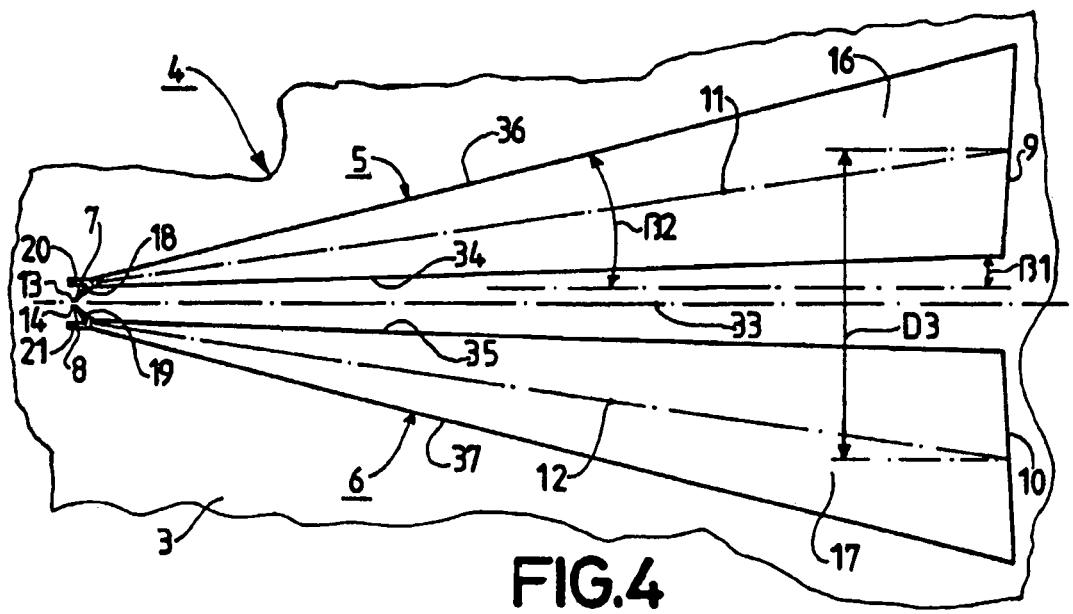
FIG. 4 shows in the same manner as FIGS. 2 and 3 a portion of a data carrier in a third embodiment of the invention and an antenna configuration in a third embodiment of the invention.

FIG. 4 shows a modification of the antenna configuration 4 of FIG. 3. FIG. 4 shows only the antenna configuration 4, i.e. no integrated components and no further electronic component are shown in FIG. 4. The antenna arms 5, 6 of the antenna configuration 4 of FIG. 4 do not have a constant width in the region of their base portions 16, 17, as was the case in the antenna configuration 4 of FIGS. 1, 2 and 3. In the antenna configuration 4 of FIG. 4, each antenna arm 5, 6 has a width that increases from its first end 7, 8 towards its second end 9, 10. The base portions 16, 17 of the antenna arms 5, 6 are thus given a V-shape.

The arrangement is made such that the antenna configuration 4 is symmetrically mirrored with respect to a plane of symmetry 33, so that the antenna arms 5, 6 have a mirrored symmetry. The arrangement of the base portions 16, 17 of the antenna arms 5, 6 is such that the inner boundaries 34, 35 of the base portions 16, 17 are at an angle β1 of approximately 2° to the plane of symmetry 33. The outer boundaries 36, 37 of the base portions 16, 17 of the antenna arms 5, 6 are at an angle β2 of approximately 15° to the plane of symmetry 33. It is to be noted that the angle β1 may alternatively be 5° or 10°. The angle β2 may also be only 10°, or 20°. It should also be noted that the inner boundaries 34, 35 and the outer boundaries 36, 37 may have the same length for the two antenna arms 5, 6. In an arrangement of the antenna configuration 4 without mirror symmetry, the angle β1 and the angle β2 and the length of the inner boundary 34 and the length of the outer boundary 36 of the first antenna arm 5 may be chosen to be different from the angle β1 and the angle β2 and the length of the inner boundary 35 and the length of the outer boundary 37, respectively, of the antenna arm 6.

The V-shaped arrangement of the base portions 16, 17 of the antenna arms 5, 6 described above achieves a clearly higher efficiency of the antenna configuration 4 in comparison with an arrangement with a constant width of the base portions 16, 17, which is caused by an advantageously high radiant efficacy and an advantageously high radiation efficiency and an advantageously low reflection.

Figure 5:
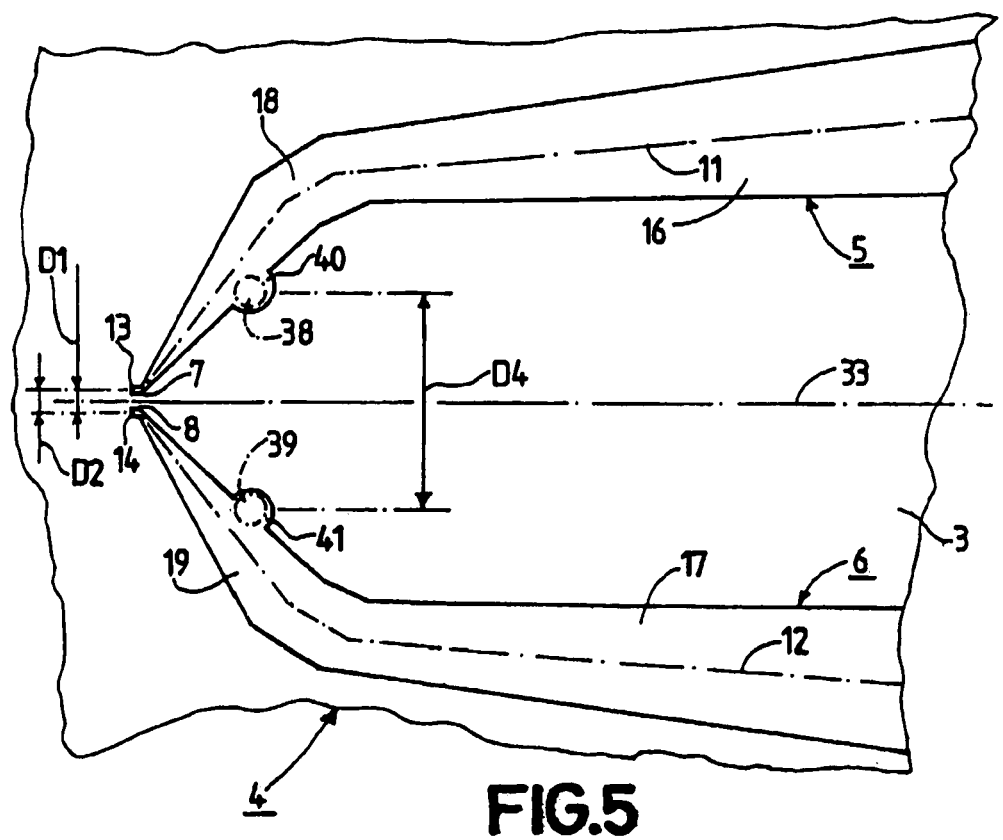
FIG. 5 shows in the same manner as FIGS. 2, 3 and 4 a portion of a data carrier in a fourth embodiment of the invention and a portion of an antenna configuration in a fourth embodiment of the invention.

FIG. 5 shows a modification of the antenna configuration 4 of FIG. 2. In the antenna configuration 4 of FIG. 5, the angled portions 18, 19 of the antenna arms 5, 6 are more strongly angled than in the antenna configuration 4 of FIG. 2. This has the result that the base portions 16, 17 of the antenna arms 5, 6 are at a great distance from one another already at a comparatively short distance from the two coupling zones 13, 14. This provides the advantage that a lower coupling obtains between the base portions 16, 17 of the two antenna arms 5, 6, as compared with the coupling between the antenna arms in the arrangement of FIGS. 1, 2, 3 and 4, which is advantageous in view of obtaining as high as possible an efficiency of the antenna configuration, as was found in experiments. The stronger angling of the antenna arms 5, 6 of the antenna configuration 4 according to FIG. 5 provides an improved radiation efficiency and an improved impedance adaptation in comparison with the other embodiments described.

In the antenna configuration 4 of FIG. 5, the angling of the antenna arms 5, 6 is realized in two stages, as is clearly apparent from FIG. 5. It is to be noted that the angling may alternatively take place in more than two stages, for example three or four stages. Angling may also take place in a plurality of stages, and it may even go so far that the angling takes the form of a continuous arc, for example a circular arc.

The antenna configuration 4 of FIG. 5 also comprises two coupling regions 38, 39 for electrically coupling two respective terminals of a further electronic component, which is not shown in FIG. 5. The two coupling regions 38, 39 are diagrammatically indicated in FIG. 5 with dash-dot circles. The two coupling regions 38, 39 are not wholly, but substantially provided on respective extensions 40, 41 projecting laterally from the antenna arms 5, 6. The extension 40, 41 of an antenna arm 5, 6 here projects from the side of the antenna arm 5, 6 facing the other antenna arm 6, 5. Each extension 40, 41 is here realized as a rounded bulge. The bulge may alternatively be V-shaped or U-shaped. The two coupling regions 38, 39 lie approximately centrally on the angled portions 18, 19 of the antenna arms 5, 6 in this case.

The antenna configuration 4 of FIG. 5 comprises two antenna arms 5, 6 wherein the antenna arms 5, 6, like the antenna arms 5, 6 of the antenna configuration 4 of FIG. 4, have a V-shaped or wedge-shaped planar dimension, which is advantageous for achieving a high radiation efficiency of the antenna configuration 4.

The antenna configurations 4 described above are mainly designed for use in so-termed RFID systems (Radio Frequency IDentification), for which the transmission frequencies lie in the HF range above 800 MHz. Particularly advantageous features of the described antenna configurations 4 are the particularly high achievable efficiency and the possibility of connecting semiconductor chips with different housing shapes or with different contacting methods (flip chip, wire bonding, surface-mounted device) to one and the same antenna configuration, as desired, so as to form a data carrier (transponder). It is easy in this manner to realize tags and labels with various semiconductor fittings.

The invention claimed is:

1. An antenna configuration comprising:
   a carrier;
   a first antenna arm and a second antenna arm, each of the two antenna arms connected to the carrier and formed from an electrically conductive material, and each of the two antenna arms having a first end, a second end and a central longitudinal portion extending from the first end to the second end, said two central longitudinal portions located a first distance from one another at the two first ends,
      wherein each of the two first ends has a coupling zone for electrically coupling the two antenna arms to a terminal of an integrated component designed for communicating in a contactless manner, the two coupling zones located a second distance from one another, and the two coupling zones provided on the carrier,
      wherein said two central longitudinal portions are located a third distance from one another at the two second ends, the third distance being greater than the first distance and greater than the second distance, and the central longitudinal portions enclose an acute opening angle with one another,
      wherein each of the two antenna arms has a coupling region arranged on the carrier at a distance from its coupling zone, said two coupling regions located a fourth distance from one another, the fourth distance being greater than the second distance, and each of the two coupling regions for electrically coupling the two antenna arms to a terminal of a further electronic component, and
   each of the antenna arms has a base portion that extends from the coupling zone to the second end and has an angled portion that extends from the first end to the coupling zone, the base portions of the antenna arms enclosing a first acute opening angle on the carrier between the base portions and the angled portions of the antenna arms enclosing a second acute opening angle on the carrier between the angled portions, the second acute opening angle being larger than the first acute opening angle.

2. An antenna configuration as claimed in claim 1, wherein the first acute opening angle is less than or equal to 40°.

3. A device for contactless communication with a communications station, the device comprising:
   a data carrier;
   first and second electronic components connected to the data carrier and each having connection terminals; and
   an antenna configuration including two electrically conductive antenna arms that are connected to the data carrier, each of the two antenna arms having
      a first end that includes a coupling zone that is electrically connected to one of the connection terminals of the first electronic component, the first ends of the two antenna arms located a first distance apart from one another on the data carrier,
      a second end, the second ends of the two antenna arms located a second distance apart from one another on the data carrier that is greater than the first distance,
      a coupling zone that is located between the first end and the second end and that is electrically connected to one of the connection terminals of the second electronic component, the coupling zones of the two antenna arms located a third distance apart from one another on the data carrier that is greater than the first distance and that is less than the second distance, and wherein each of the two antenna arms has a base portion that extends from the coupling zone to the second end and an angled portion that extends from the first end to the coupling zone, the base portions of the two antenna arms enclosing a first acute opening angle on the data carrier between the base portions and the angled portions of the two antenna arms enclosing a second acute opening angle on the data carrier between the angled portions, the second acute opening angle being larger than the first acute opening angle and the two antenna arms enclose an acute opening angle on the data carrier between the two antenna arms.

4. A device as claimed in claim 3, wherein the first acute opening angle is less than 40°.

* * * * *